I. C. Shuler,
Coffin,
Nº 24,409.   Patented June 14, 1859.
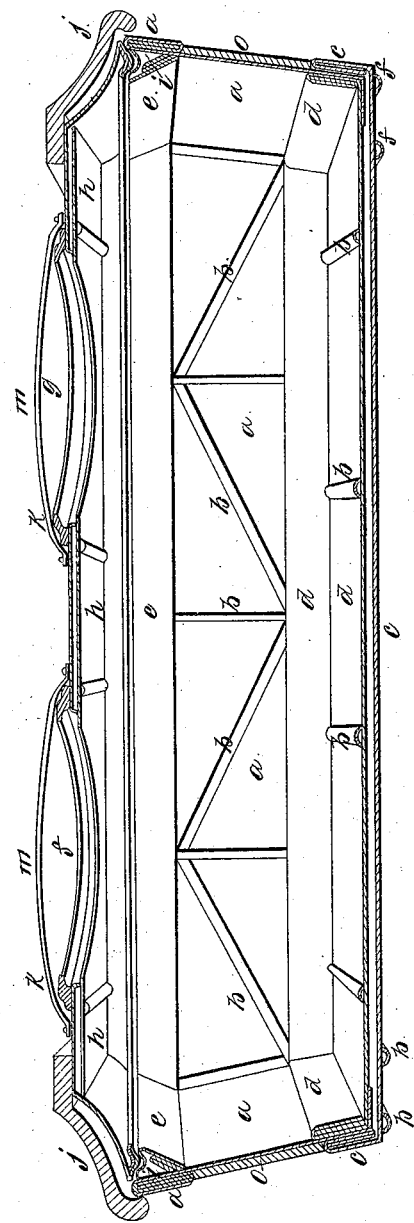
Witnesses:
B. T. Blood
J. Souly
Inventor:
Isaac C. Shuler

UNITED STATES PATENT OFFICE.

ISAAC C. SHULER, OF AMSTERDAM, NEW YORK.

CONSTRUCTING SHEET-METAL COFFINS.

Specification of Letters Patent No. 24,409, dated June 14, 1859.

*To all whom it may concern:*

Be it known that I, ISAAC C. SHULER, of Amsterdam, in the county of Montgomery and State of New York, have invented sundry Improvements in Sheet-Metal Coffins; and I do hereby declare that the following is a full, clear, and exact description of the same, reference being had to the accompanying drawing, and to the letters of reference marked thereon, forming part of this specification, which represents a vertical longitudinal section of a sheet-metal coffin embracing my improvements.

The form in which the different portions of sheet metal composing my coffins are cut out will be readily apparent to mechanics upon consulting the drawing of the coffin completed. The sides ($a$) being properly cut out of galvanized sheet iron (the metal best adapted to this purpose) are scrolled over and over, each fold being hammered and soldered consecutively together, and a flange of three or four inches width being turned inward at the bottom, the entire sheet is worked up with proper breaks into coffin shape. (The scrolling in all cases is designed to give strength and stiffness to the sheet metal.) This structure is then set into a tray or pan ($c$) whose sides are scrolled and soldered in like manner (see the drawing) and to which it is firmly fixed with solder. I then set another tray or pan ($d$) of similar construction to the first, inside the coffin, resting on the flange of the sides, to which this also is firmly soldered. I then apply the ribs ($b$) of either hollow or solid metal, to those parts marked in the drawing. I also apply the studs ($o$) on the outside, for the double purpose of strengthening the sides, and of forming an ornamental panel work on their exterior surface. Just within the upper edges of the sides ($a$) I next solder the piece ($e$) with the groove ($i$) in its upper surface. This piece is also scrolled and soldered within the triangular chamber seen in the drawing, for the purpose of stoutly sustaining the cover of the coffin.

The cover being pressed out by means of proper machinery, has an ornamental swelling top, and is scrolled under at its outer edges, and formed with a bead which fits in the groove ($i$) in the piece ($e$) to which groove it is soldered after the corpse is placed in the coffin. The top being perforated for the windows ($f$ and $g$) the edges of the orifices are pressed downward in recesses for the reception of glass,—the recess in the orifice ($f$) being skirted with a flange which sustains the glass, and the glass in the orifice ($g$) being supported by the extension of a second inside sheet ($h$) soldered to the upper sheet. The sheet ($h$) also serves the purpose of stiffening the entire cover. The sash or guards ($k$) are cast metal pieces, screwed to the cover at the setting of the glass. The blinds ($m$, $m_{,}$) are of sheet metal, pressed, and serve to protect the glass from falling earth, at interment, as well as from casualties previous thereto. The joints formed by soldering the cover to the groove ($i$) are covered by the bisected frame ($j$) which is fixed to the outer cover with proper hinges. The inside of the coffin should then be furnished with soldered strips of perforated tin to which may be sewed the interior clothing or furniture, and the outside, grained, or painted in any desirable style.

Having thus described my improvements, I claim—

1. The arrangement of strengthening the lower part of a sheet-metal coffin by folding over and soldering together consecutively in several thicknesses the surplus metal of the sides and ends of a sheet metal tray ($c$) forming a rim all around the outside circumference of the base, and fastening the walls of the coffin firmly thereto, I claim also the arrangement of fastening to the under side of this tray, or bottom of the coffin, the frames ($b$. $b$.) for the purpose of stiffening it.

2. The arrangement of placing on the inside of a sheet-metal coffin a metal trap ($d$) with scrolled edges, which rests on a flange formed by turning in the walls of the coffin all around their lower edges, and fastening this tray firmly thereto, and also to the walls, for the purpose of strengthening the structure, I also claim the bars ($b$) for strengthening this tray.

3. The arrangement of scrolling or folding outwardly, and soldering consecutively each fold of the surplus edges of the walls of a sheet metal coffin, forming a rim all around the upper edge of the walls for the purpose of strengthening and securing the same in straight lines for jointing, substantially as described.

4. The arrangement of forming on the inside of the upper edges of the walls of a sheet metal coffin a scrolled rim on the piece ($e$) for the purpose of more firmly supporting the air-tight cover, and also for the purpose of securing the cover by screws as well as by solder when desirable.

5. The arrangement of fastening on the outside of a sheet metal coffin between the stiffening rims of the upper and lower edges of the walls, the studs or pillars (*o*) at the corners, and along the sides and ends, in any required number according to the size of the coffin, for the purpose of stiffening the sheet metal, in order that the structure may sustain a heavy weight.

6. The arrangement of scrolling and soldering together the surplus edges of the air-tight cover of a sheet metal coffin, and beading the same, which, on being turned under, serves to fit the groove (*i*) as well as to stiffen the cover, also the stiffening bars (*h*) substantially as described.

7. The arrangement of pressing a recess in the sheet metal all around the windows of a sheet metal coffin, for receiving and supporting the glass, I also claim the arrangement of supporting the glass by a flange formed by the extension of a second inside sheet of the double cover.

8. The arrangement of fastening the glass in these recesses by means of metal sashes fastened to the coffin lid, as described.

9. I claim the flanges formed on the outer edges of the sheet metal blinds (*m. m.*) for the purpose of closing around the metal sash, and securing the glass from the intrusion of dust, and from other annoyances.

10. I am aware that I have claimed the bisection of a hinged cover for the joint of the lid of a sheet metal coffin, according to the breaks in the side-walls: I claim the cover (*j*) as applicable to a coffin with straight side walls, in two hinged sections as described.

ISAAC C. SHULER.

Witnesses:
 BENJ. F. BLOOD,
 ISAAC SOULES.